July 7, 1959 D. G. MORISON 2,894,114
FLASH-BUTT RESISTANCE WELDING MACHINES
Filed Feb. 19, 1958 5 Sheets-Sheet 1

July 7, 1959  D. G. MORISON  2,894,114
FLASH-BUTT RESISTANCE WELDING MACHINES
Filed Feb. 19, 1958  5 Sheets-Sheet 5

Inventor
David Gray Morison
by Stevens, Davis Miller & Mosher
his attorneys

United States Patent Office 2,894,114
Patented July 7, 1959

2,894,114

FLASH-BUTT RESISTANCE WELDING MACHINES

David Gray Morison, Inverness, Scotland, assignor to Resistance Welders Limited, Inverness, Scotland Application February 19, 1958, Serial No. 716,187

Claims priority, application Great Britain February 28, 1957

6 Claims. (Cl. 219—101)

This invention relates to flash-butt resistance welding machines of the kind in which the moving head is displaced during the flashing and butting operations by liquid pressure acting on a suitable ram, the liquid being placed under pressure by a pressure-multiplying device actuated by compressed air.

In previous welding machines of the kind referred to, either the degree of pressure multiplication has remained constant during both the flashing and the butting operations, or separate pressure-multiplying devices have been employed for the two purposes. Both of those arrangements have disadvantages, and the object of the present invention is to provide an improved pressure system for operating the moving head which avoids those disadvantages.

According to the invention, in a flash-butt resistance welding machine of the kind referred to the pressure-multiplying device comprises a piston in a single air cylinder acting simultaneously on two plungers, one of larger cross-sectional area than the other, operating in separate pressure chambers, valve means being provided which are operable to effect selectively simultaneous connection of both pressure chambers to the ram cylinder or connection of the pressure chamber in which the smaller plunger acts to the ram cylinder and connection of the other pressure chamber to a low-pressure reservoir.

The two plungers are preferably co-axial.

The invention is hereinafter described with reference to the accompanying diagrammatic drawings, in which.

Figure 1:
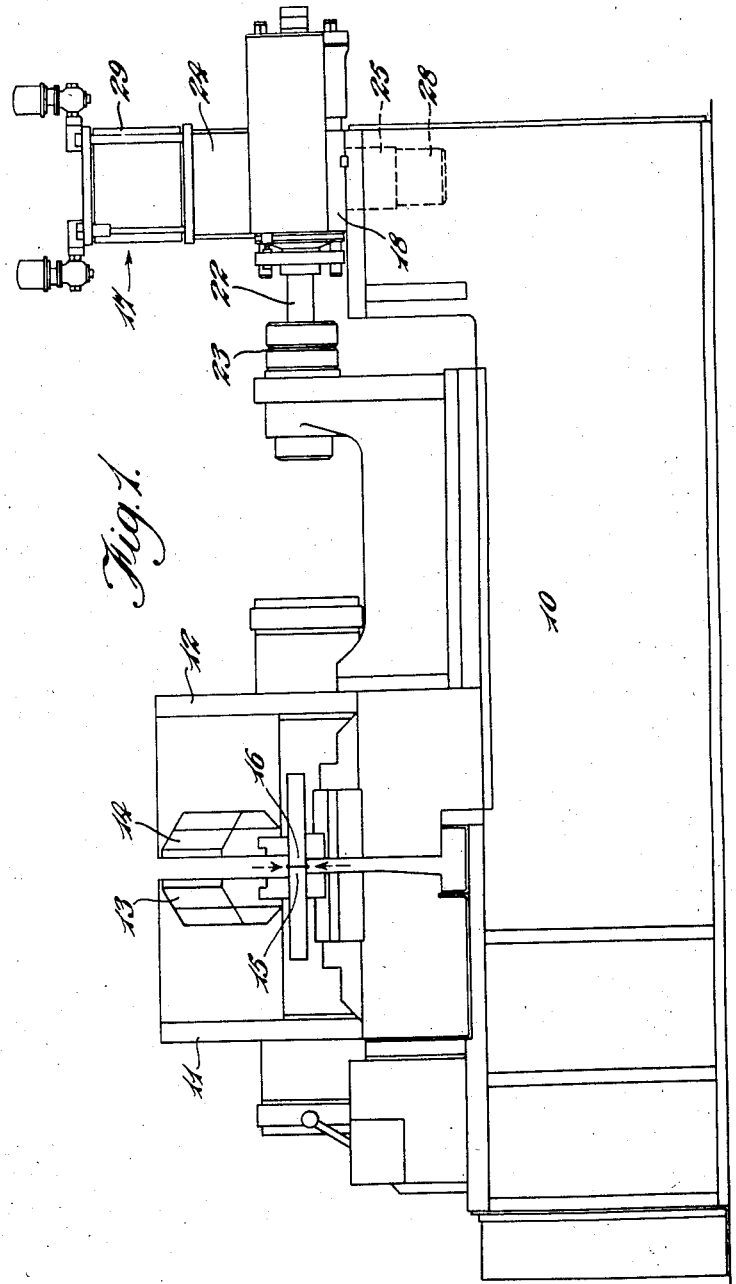
Figure 1 is a front elevation of a flash-butt resistance welding machine embodying the invention.

Referring to Figure 1, the welding machine comprises a frame 10 carrying a fixed head 11 and having slidably mounted on it for movement towards and away from the fixed head a moving head 12. Both the fixed head 11 and the moving head 12 carry clamping means, shown at 13 and 14 respectively, for work-pieces such as are indicated at 15 and 16, and welding current is fed to the work-pieces by any suitable means, for example through the clamping means 13 and 14.

A power unit 17 for operating the moving head 12 is mounted on the frame 10, the power unit including a block 18 in which is formed a cylinder 19 (Figures 2 to 5) for a main ram 21 (Figure 5), which ram has a portion 22 extending from the cylinder 19 and coupled at 23 to the moving head 12. On the top of the block 18 there is provided a reservoir 24 for liquid, preferably oil, the block and a downward extension 25 thereof being formed with a vertically disposed cylindrical opening forming an upper pressure chamber 26, opening at its lower end into a lower cylindrical pressure chamber 27 formed in a plug member 28 which is secured to the bottom of the extension 25. An air cylinder 29 is mounted above the reservoir 24, the air cylinder 29, upper pressure chamber 26 and lower pressure chamber 27 being co-axial.

Figure 2:
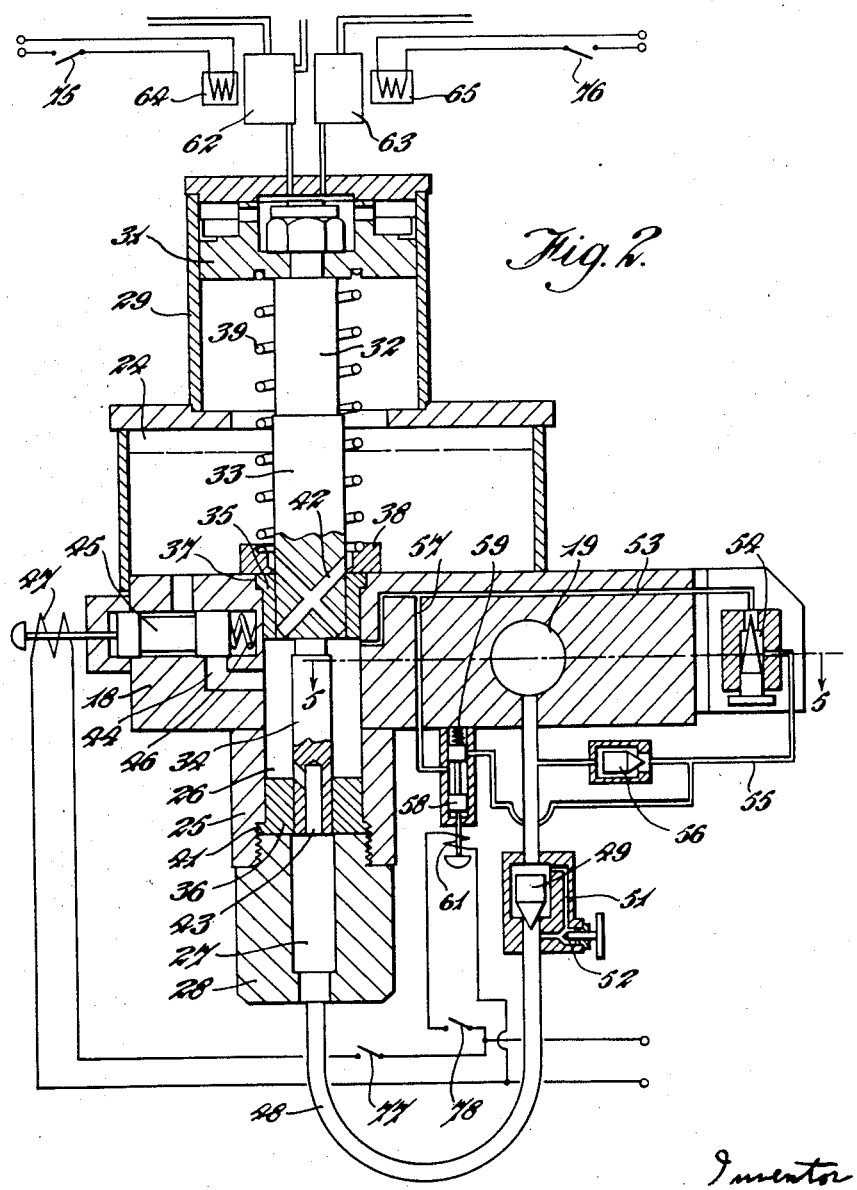
Figure 2 is a vertical cross-section, on a larger scale, taken through the power unit 17 of Figure 1, showing the pressure system inoperative.
Figure 3:
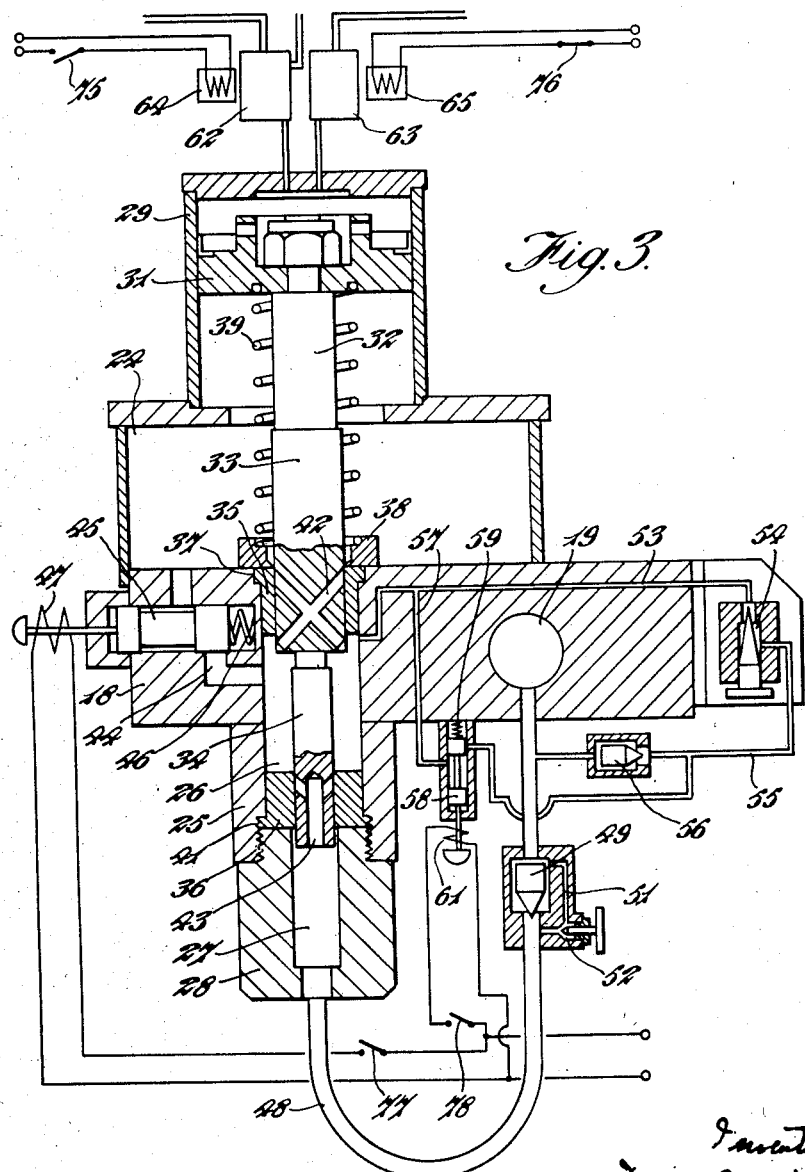
Figure 3 is a cross-section similar to Figure 2 showing the system during a flashing operation.
Figure 4:
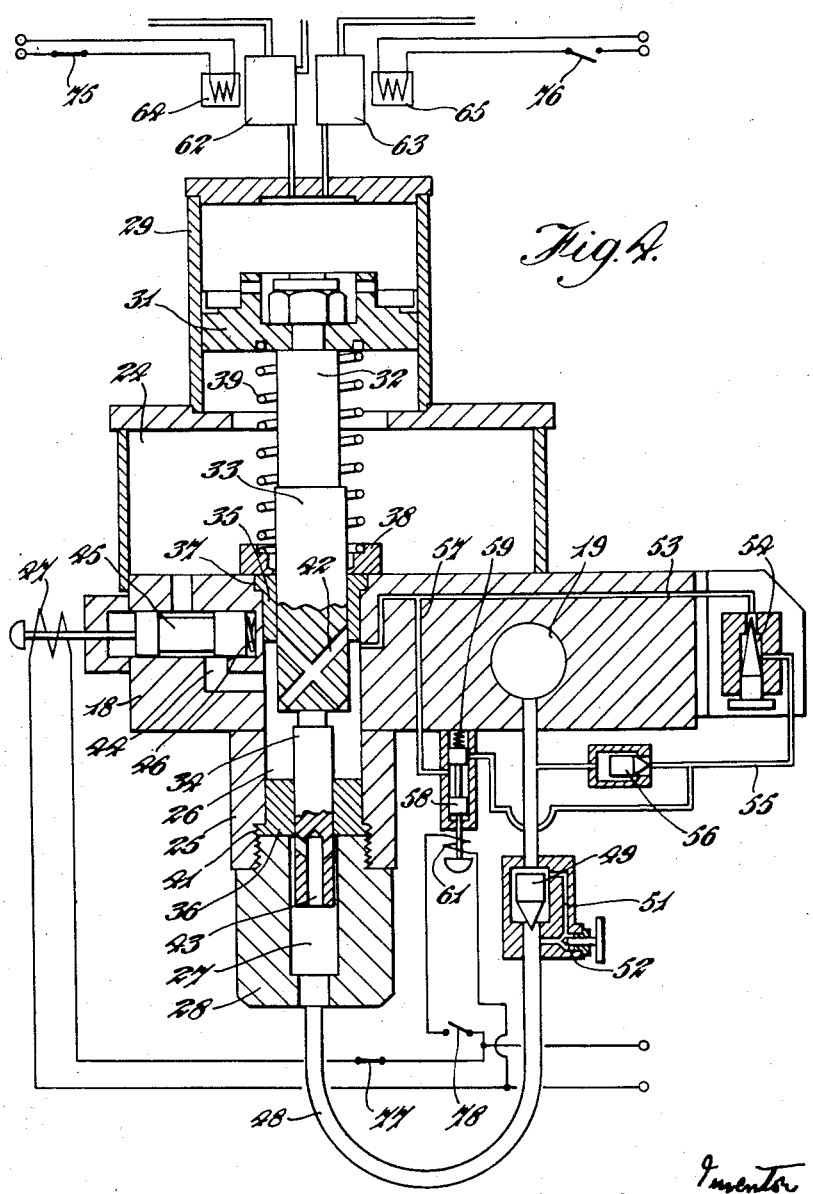
Figure 4 is a cross-section similar to Figure 2 showing the system during a butting operation.
Figure 5:
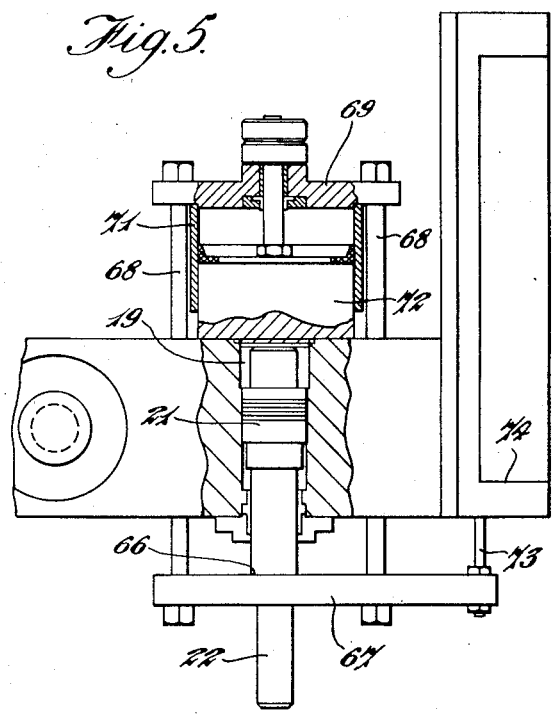
Figure 5 is a partial sectional plan view on the line 5—5 of Figure 2.

Referring to Figures 2 to 4, a piston 31 slidably mounted in the air cylinder 29 is mounted on a stem 32 which extends downwardly through the reservoir 24 and has portions of larger and smaller diameter respectively constituting plungers 33 and 34 acting in the pressure chambers 26 and 27. The plunger 33 is a close sliding fit in a bearing sleeve 35 which is fitted in the upper end of the pressure chamber 26, and the plunger 34 is a close sliding fit in a bearing sleeve 36 fitted in the upper end of the pressure chamber 27. Each of the bearing sleeves makes a substantially fluid-tight fit with both the plunger which passes through it and with the wall of the pressure chamber in which it is mounted. The bearing sleeve 35 is located endwise in the pressure chamber 26 by a flange 37 at its upper end engaging a shoulder in the pressure chamber, and is prevented from moving upwardly by a ring 38 forming an abutment for a spring 39 acting upwardly on the piston 31. The bearing sleeve 36 is provided with a flange 41 which engages with a shoulder in the lower end of the pressure chamber 27 and is held thereagainst by a reduced end portion of the plug member 28 which is screw-threaded and engages with a corresponding screw thread below the shoulder in the pressure chamber 27.

The lower end of the plunger 33 is formed with passages, for example oblique drillings 42 as shown in Figures 2 to 4 which, when the plunger is in its uppermost position shown in Figure 2, provide free communication between the reservoir 24 and the pressure chamber 26. Similarly, the lower end of the plunger 34 is provided with passages such as an axial drilling 43 and lateral drillings breaking thereinto, to provide a communication between the two pressure chambers when the plunger 34 is in its uppermost position.

A passage 44 of substantial cross-sectional area leads from the pressure chamber 26 to the reservoir 24, the said passage being controlled by a slide valve 45 urged by a spring 46 to the position shown in Figures 2 and 3 in which it closes the passage 44, and movable by energising a solenoid 47 to the position shown in Figure 4, in which it opens the said passage. Another passage 48, also of substantial cross-sectional area leads from the pressure chamber 27 to the main ram cylinder 19, a non-return valve 49 in the said passage 48 being by-passed by a passage 51 in which is provided a variable restriction at 52. A passage 53 of relatively small bore leads from the pressure chamber 26 to a metering valve 54, shown as being of the tapered needle type, a further passage 55 leading from the metering valve 54 into the passage 48 adjacent the cylinder 19, and having a non-return valve 56 mounted therein. Branching from the passage 53, between the pressure chamber 26 and the metering valve 54, is another passage 57 leading into the passage 55 between the metering valve 54 and the non-return valve 56, the passage 57 being controlled by a slide valve 58, similar to the slide valve 45, the slide valve 58 being urged by a spring 59 to the position shown in Figures 2, 3 and 4 in which it closes the passage 57, and being movable by energising a solenoid 61 to a position in which it allows liquid to pass directly from the pressure chamber 26 to the ram cylinder 19 without passing through the metering valve 54.

Air under pressure is admitted to the air cylinder 29, and released therefrom, by two supply valves indicated at 62 and 63 respectively, the valve 62 being connected to a source of compressed air at a variable pressure, say 20 to 80 pounds per square inch, and the valve 63 being connected to a source of compressed air at a substantially higher pressure, say 80 pounds per square inch. The valves 62 and 63 are controlled by solenoids 64 and 65 respectively, the valve 62 connecting the air cylinder to an exhaust pipe when not connecting it to an air supply, whereas the valve 63 is a simple on-off valve.

The projecting portion 22 of the ram 19 has a shoulder 66 which engages with a plate 67 coupled by tie bars 68 to another plate 69 at the rear of the block 18, the plate 69 carrying a cylinder 71 in which is slidable a piston 72 fixed to the rear face of the block 18. A valve (not shown) similar to the valves 62, 63 controls the supply of compressed air to the cylinder 71. The plate 67 also carries a rod 73 which extends into a control box 74 and, at suitable points in the stroke of the ram 21 operates switches, such as those indicated at 75, 76, 77 and 78 in Figures 2 to 5, to control the various valves.

The machine according to the invention operates in the following manner. Workpieces 15, 16 to be welded together are set up in the machine, as shown in Figure 1, and are pre-heated by moving the moving head 12 to and fro with the welding current switched on, so that the work-pieces alternately make and break contact, and current is passed through them for a short time at each making of contact. The to-and-fro movement of the moving head is produced by alternately operating the valve 62 to admit air under pressure to the air cylinder 29, and operating the valve associated with the cylinder 71 to admit air to that cylinder. The operation of the valve 62 to admit air under pressure to the air cylinder 29 causes the piston 31 and rod 32 to move downwardly, first closing the passages 42 and 43 to isolate the pressure chambers 26 and 27 and then causing liquid to be ejected from both chambers into the ram cylinder 19 to move the ram 21 forwardly. The switch 78 is held closed during pre-heating so that the liquid flows from the pressure chamber 26 to the ram cylinder 19 without passing through the metering valve, and the advance of the moving head 12 is relatively rapid. The rate of the return stroke is controlled by the variable restriction 52, since all the liquid returning from the ram cylinder 19 has to pass through the passage 48. The alternate operation of the valves admitting air to the cylinders 29 and 71 may be effected manually or automatically, automatic operation, for example, being effected in accordance with the voltage changes in the welding circuit due to the making and breaking of contact between the work pieces.

When the work-pieces have been sufficiently preheated, air is admitted to the air cylinder 29 through the valve 63, and, at the same time, the switch 78 is opened to de-energize the solenoid 61 and allow the valve 58 to close the conduit 57, so that liquid passing from the pressure chamber 26 to the ram cylinder 19 must pass through the metering valve 54, and the rate of advance of the work piece 16 towards the work-piece 15 is controlled by the setting of the metering valve. The metering valve is set to provide a rate of advance commensurate with the rate of burning away of the work-pieces due to the flashing, so that the flash is maintained. The parts are now in the positions shown in Figure 3 of the drawing.

After a predetermined movement of the work-piece 16 the rod 73 actuates the switch 77 to move the valve 45 to the position shown in Figure 4, with the result that liquid from the pressure chamber 26 is able to pass idly back to the reservoir 24, and liquid is passed to the ram cylinder 19 only from the pressure chamber 27. Since the pressure chamber 26 is now freely connected to the reservoir 24 the pressure generated in the liquid is a multiple of the air pressure in the cylinder 29 depending on the ratio of the area of the plunger 34 to the area of the piston 31, instead of, as when the valve 45 was closed, being a multiple of the said air pressure depending on the ratio of the area of the plunger 33 to the area of the piston 31. A substantially increased pressure is therefore produced in the ram cylinder 19 to forge the two workpieces together, and, since the air cylinder 29 is already under pressure when the valve 45 is opened, and liquid is already moving from the pressure chamber 27 towards the ram cylinder 19, there is no appreciable time-lag before the forging pressure is built up, and the butting and forging follow substantially instantaneously upon the opening of the said valve. Thus very little heat is lost before forging takes place.

When forging has been completed, the air pressure is cut off from the air cylinder 29 and is admitted to the cylinder 71 to withdraw the moving head. During this return movement, and during the corresponding movements of the pre-heating cycle, liquid from the ram cylinder 19 is returned into the pressure chamber 27 through the passage 48 and variable restrictor 52. No liquid is returned to the pressure chamber 26 owing to the presence of the non-return valve 56. Since liquid has been fed into the ram cylinder 19 from both pressure chambers, the quantity to be returned is more than has been displaced from the pressure chamber 27, and consequently the returning liquid ensures the raising of the plungers to the top of their stroke by reason of the fact that excess liquid must escape from the pressure chamber 27 into the pressure chamber 26 and can do this only if the passage 43 is open.

I claim:

1. In a flash-butt resistance welding machine comprising a frame including a fixed head, a moving head, a ram cylinder mounted on the frame, a ram in said cylinder acting on the moving head, a liquid reservoir, and a compressed-air actuated pressure-multiplying device for placing under pressure liquid acting in the ram cylinder to displace the ram and thereby move the moving head towards the fixed head, provision of a pressure-multiplying device comprising two plungers operating respectively in two pressure chambers, common pneumatic means acting simultaneously on both said plungers, conduit means connecting said pressure chambers to said ram cylinder, and valve means in said conduit means operable to effect selectively simultaneous connection of both pressure chambers to the ram cylinder or connection of one of the said pressure chambers to the ram cylinder and of the other of said pressure chambers to the liquid reservoir.

2. The combination as claimed in claim 1, including a stepped stem the larger and smaller portions of which constitute respectively the two plungers.

3. In a flash-butt resistance welding machine comprising a frame including a fixed head, a moving head, a ram cylinder mounted on the frame, a ram in said cylinder acting on the moving head, and a compressed-air actuated pressure multiplying device for placing under pressure liquid acting in the ram cylinder to displace the ram and thereby move the moving head towards the fixed head, the provision of a pressure multiplying device comprising a stepped stem constituting two plungers operating respectively in two pressure chambers disposed with their axes vertical, pneumatic means acting downwardly on said stepped stem, a liquid reservoir above said pressure chambers, passage means in both of said plungers, said passage means respectively connecting one pressure chamber to the reservoir and the other pressure chamber to the first-mentioned pressure chamber when the plungers are raised, conduit means connecting said pressure chambers to said ram cylinder, and valve means in said conduit means operable to effect selectively simultaneous connection of both pressure chambers to the ram cylinder or connection of one of the said pressure chambers to the ram cylinder and of the other of said pressure chambers to the liquid reservoir.

4. In a flash-butt resistance welding machine comprising a frame including a fixed head, a moving head, a ram cylinder mounted on the frame, a ram in said cylinder acting on the moving head, and a compressed-air actuated pressure multiplying device for placing under pressure liquid acting in the ram cylinder to displace the ram and thereby move the moving head towards the fixed head, the provision of a pressure multiplying device comprising a stepped stem contituting two plungers operating respectively in two pressure chambers disposed with their axes vertical, pneumatic means acting downwardly on said stepped stem, a liquid reservoir above said pressure chamber, passage means in both of said plungers, to place said pressure chambers in communication with the reservoir when the plungers are raised, conduit means connecting said pressure chambers to said ram cylinder, valve means in said conduit means operable to effect selectively simultaneous connection of both pressure chambers to the ram cylinder or connection of one of said pressure chambers to the liquid reservoir and of the other of said pressure chambers to the ram cylinder, a non-return valve in the conduit means between the last-mentioned pressure chamber and the ram cylinder, means providing a by-pass around the non-return valve and flow restricting means in said by-pass.

5. In the combination claimed in claim 4, the provision of a second non-return valve in the conduit means between the ram cylinder and the pressure chamber which is connectible to the reservoir simultaneously with the connection of the other pressure chamber to the said ram cylinder, to prevent return flow of liquid from said cylinder to said pressure chamber.

6. In the combination claimed in claim 5, the provision of two conduits for the flow of liquid to the second non-return valve from the pressure chamber which is connected to the ram cylinder through said valve, a metering valve being provided in one of said conduits and a shut-off valve in the other of said conduits, so that liquid can be transferred from the said pressure chamber to the ram cylinder with or without passing through the metering valve.

References Cited in the file of this patent

UNITED STATES PATENTS

| | | |
|---|---|---|
| 2,647,980 | Moore | Aug. 4, 1953 |
| 2,781,026 | Schlatter et al. | Feb. 12, 1957 |